United States Patent [19]

Nakayama et al.

[11] Patent Number: 5,079,852
[45] Date of Patent: Jan. 14, 1992

[54] SLUDGE TREATING APPARATUS

[75] Inventors: Yoshio Nakayama, Koganei; Hiromi Tsukui, Yokohama, both of Japan

[73] Assignee: Kabushiki Kaisha Toshiba, Kawasaki, Japan

[21] Appl. No.: 343,588

[22] Filed: Apr. 27, 1989

[30] Foreign Application Priority Data

Apr. 28, 1988 [JP] Japan .................. 63-104056
May 16, 1988 [JP] Japan .................. 63-117018
Jun. 13, 1988 [JP] Japan .................. 63-143751

[51] Int. Cl.$^5$ .................................................. F26B 13/10
[52] U.S. Cl. .......................................... 34/44; 34/60; 34/86
[58] Field of Search .................. 110/234, 185; 34/60, 34/179, 181, 133, 44, 48

[56] References Cited

U.S. PATENT DOCUMENTS 2,062,025 11/1936 Harrington .................. 110/234
4,754,607 7/1988 Mackay .................. 237/12.1

Primary Examiner—Henry A. Bennet
Attorney, Agent, or Firm—Oblon, Spivak, McClelland, Maier & Neustadt

[57] ABSTRACT

A sludge treating apparatus is disclosed which includes a gas turbine engine generator, an exhaust boiler for generating heated vapor using exhaust heat coming from the gas turbine engine generator, and a dryer for drying a sludge supplied from an external source through the utilization of heated vapor coming from the exhaust boiler, to thereby provide a dried sludge.

11 Claims, 4 Drawing Sheets

SLUDGE TREATING APPARATUS

BACKGROUND OF THE INVENTION

1. Field of the Invention

The present invention relates to an improved apparatus capable of treating a sludge.

2. Description of the Related Art

A conventional capacity-reducing type sludge treating apparatus is often of such a type that it performs reduction of a sludge capacity by conducting a primary dehydration process by means of a mechanical dehydrator to reduce the water content level of the sludge normally to 80 to 70%, conducting a secondary dehydration process by means of a hydro-extractor and conducting a burning-up process by means of a burn-up furnace.

In this case, as a source of heat to be supplied to the hydro-extractor, use may sometimes be made of heat which recovers by an exhaust heat boiler the exhaust heat of the burn-up furnace. Generally, the calorific value of the sludge is not great enough to recover the exhaust heat to an extent to which all dewatered sludge is dehydrated by a sludge dryer to a low water content level (normally 50-60%) at which spontaneous ignition can occur at the burn-up furnace. It is, therefore, necessary to generate heated vapor at a fuel boiler and supply it to the dryer.

Thus, the operation cost of the sludge treatment depends upon the generation cost of heating vapor. According to the method for supplying the heated vapor via the fuel boiler to the dryer, it is not possible to improve the operation cost.

Conventionally, the composting of the sludge is achieved by dehydrating the sludge by means of the mechanical dehydrator to a water content level of about 70 to 80%, charging it into a fermentation tank to allow it to be aerobically fermented, and stably decomposing organic matter in the sludge into a stable one for use as a compost.

However, the dewatered sludge which is dehydrated by the mechanical dehydrator has its organic matter not effectively decomposed within the fermentation tank in view of its higher water content level. In order to further lower the water content level and to enhance the passage of air in the bulk of the dewatered sludge, additive material, such as chaff and sawdust, is added to the dewatered sludge to allow the sludge to be fermented. For this reason, the cost of the additive material is imposed upon the manufacturing cost of the compost. Furthermore, the additive material, such as the sawdust, if being applied to the irrigated rice paddy, it floated there. In some districts of the world, the stable supply of the above additive material is not necessarily secured, preventing the use of such additive material.

In addition, various germs or bacteria are trapped in the dewatered sludge, failing to effectively ferment the sludge in its natural state. In these circumstances, some of the fermented compost is charged back, as a germ-contained one, into the inlet of the fermentation tank, thus enhancing its fermentation efficiency. Hence the more the dewatered sludge contains the germs or bacteria, the more a resultant compost has to be returned back into the inlet of the fermentation tank. This is the reason why the fermentation efficiency is lowered.

Generally, as a method for drying a sludge, use is made of a dehydrator utilizing heated vapor. Known as this type of dehydrator is a thin-film type dryer which converts a sludge into a thin film under a centrifugal force and, with a heat transfer area thus increased, drys it.

In the conventional dryer of this type, a variation in a liquid sludge to be supplied will result in a variation in the water content level of a dewatered sludge obtained. If there is a momentary change in the amount of sludge generated, the sludge is one stored in a tank at a preceding stage of a drying process and subjected to a batch process, thus facilitating a subsequent burn-up step and burying step. For this reason, a method has been adopted whereby it is possible to obtain a dewatered sludge of a given water content level by the constant supply of a given level of the sludge.

In the aforementioned method, however, a larger storage tank is required at the preceding state and installation spacing is difficult to secure and not economic. The quantity and temperature of heating vapor may be controlled in accordance with a variation in an amount of sludge to be supplied, but a detection response to its variation is not good, and it is also difficult to effect such control.

SUMMARY OF THE INVENTION

A first object of the present invention is to provide a sludge treating apparatus using heated vapor which can reduce the operation cost of a sludge dryer.

A second object of the present invention is to provide a sludge treating apparatus which can enhance the efficiency with which the sludge is formed into a compost.

A third object of the present invention is to provide a sludge treating apparatus which can obtain a dewatered sludge of a given water content level at all times.

In order to achieve the first object of the present invention, the exhaust heat of a gas turbine engine is recovered at an exhaust heat boiler so as to obtain heated vapor necessary to dry a sludge. In this case, the gas turbine engine is operated in manner to follow a vapor consumption level of a sludge dryer. From a generator connected to the gas turbine engine, electric power is generated which is proportional to the vapor consumption level.

With 100 representing the energy of a fuel supplied to the gas turbine engine, the vapor energy which can be recovered is about 50 and the electric power which is generated is about 30. From this ratio it will be seen that the vapor energy becomes greater than the electric power energy. Thus the gas turbine engine can most effectively be operated if it is possible to operate in a heat-following mode and at a greater heat demand.

By operating the gas turbine engine in a heat-following mode, it is also possible to consume electric power thus generated. For this reason, it is possible to perform an effective utilization of energy supplied to the gas turbine engine. This method can reduce an energy cost in comparison with a conventional method according to which heated vapor is obtained by the simple burning of fuel.

In order to achieve the second object of the present invention, the composting of the sludge can be achieved by using the sludge dryer in place of a mechanical dehydrator. That is, the sludge is heat-dried to reduce various germs or bacteria and then fermented within the fermentation tank at a water content level of about 70 to 50%, a level which is optimal to that fermentation.

In order to achieve the third object of the present invention, a plurality of sludge dryers are installed whose capacities are relatively small against a maximum amount of sludge supplied, and the number of operating sludge dryers can vary in accordance with a variation in an amount of sludge supplied so as to make constant an amount of sludge to be supplied to each sludge dryer. It is, therefore, possible to obtain a dewatered sludge of a given water content level at all times.

Stated in more detail, the third object of the present invention is achieved by a sludge drying apparatus comprising:

a plurality of dryers for drying a sludge through the utilization of heated vapor;

a liquid flowmeter for detecting a total amount of liquid fed to the dryer;

liquid valves each provided at a sludge supply tube of the respective dryer;

vapor values provided at a vapor supply tube of the respective dryer;

bleeding values provided at a vapor return tube of the dryer;

control means for receiving a detection signal of the fluid flowmeter, for calculating the number of operating dryers so as to obtain a dried sludge of a predetermined water level, and for delivering an operation instruction and opening/closing instruction as output signals.

The control means calculates a requisite number of operating dryers from the feeding liquid amount data thus received and controls the dryer, fluid value, vapor valve and bleeding value so as to supply a constant liquid amount to those dryers which are determined by the calculation.

DETAILED DESCRIPTION OF THE PREFERRED EMBODIMENTS

Figure 1:
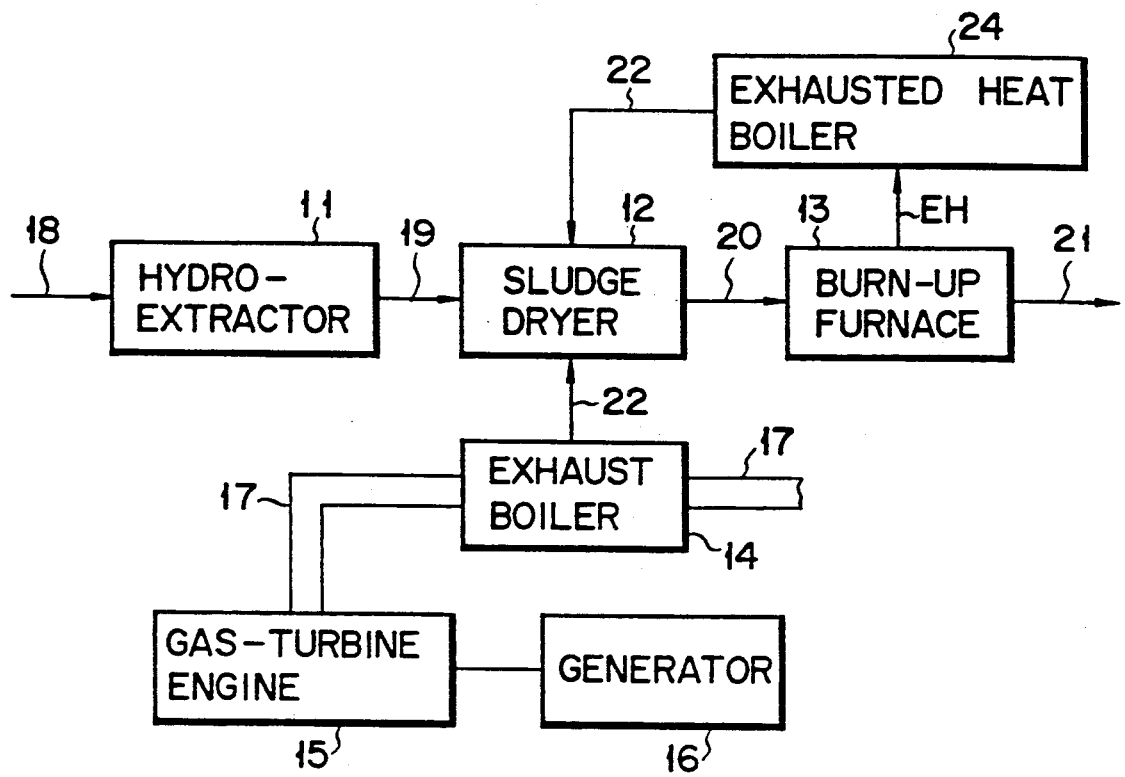
FIG. 1 is a block diagram showing an arrangement of a sludge treating apparatus according to a first embodiment of the present invention.

FIG. 1 shows an arrangement of a sludge treating apparatus (sludge evaporation type drying apparatus) according to a first embodiment of the present invention. A sludge slurry 18 is dehydrated by a hydro-extractor 11 to a dewatered sludge 19 whose water content level is about 80 to 70%. The dewatered sludge 19 is dehydrated by a sludge dryer 12 to a dried sludge 20 whose water content level is about 60 to 50%. The dried sludge 20 is burned in a burn-up furnace 13 to largely reduce its capacity. The burning-up of the dried sludge 20 leaves ash 21 which is to be thrown away.

The exhaust heat EH of a burn-up furnace 13 is recovered at an exhausted heat boiler 24. The boiler 24 generates heated vapor 22 through the utilization of the recovered exhaust heat and is returned back to the sludge dryer 12.

On the other hand, an exhaust duct 17 of a gas-turbine engine 15 which is coupled with a generator 16 is connected to an exhaust boiler 14. The exhaust boiler 14 generates heated vapor 22 through the utilization of exhausted heat coming from the engine 15 and returns it back to the sludge dryer 12. The sludge dryer 12 is adapted to dry the dewatered sludge 19 through the utilization of the heat of the heated vapors coming from the boilers 14 and 24.

Figure 2:
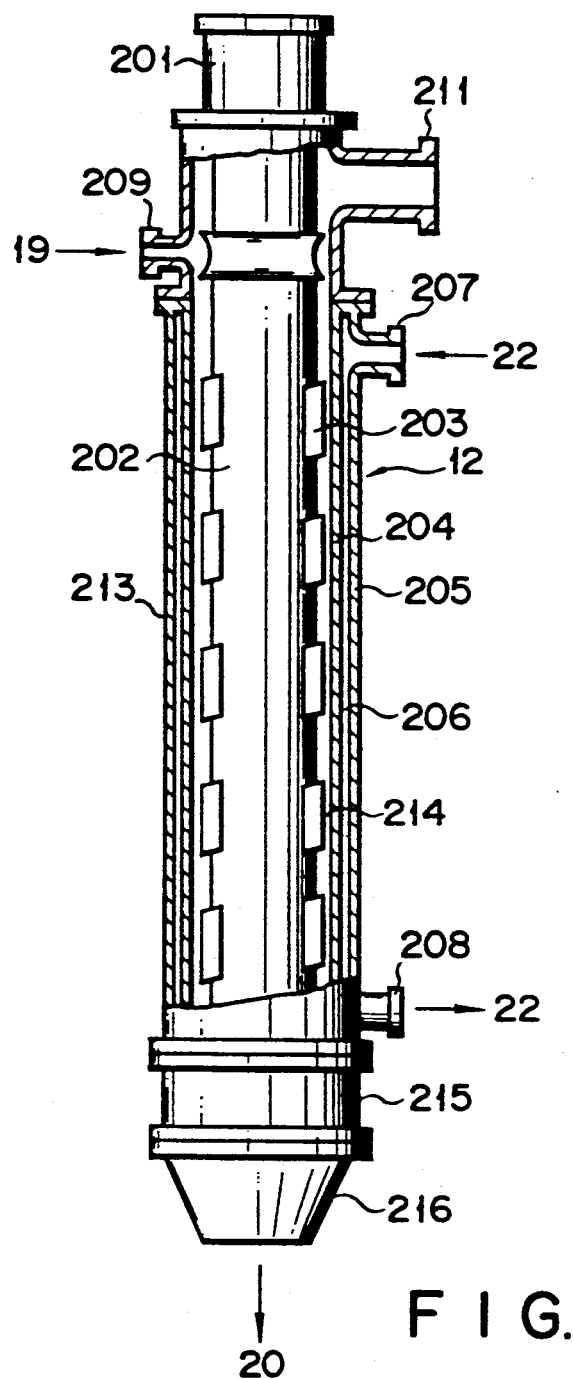
FIG. 2 is a view, partly in cross-section and partly taken away, showing a practical example of a dryer (12) in the sludge treating apparatus of FIG. 1.

FIG. 2 shows a detail of the sludge dryer 12 which utilizes the heat of the heated vapors 22 coming from the boilers 14 and 24. Within the sludge drier 12 is mounted a rotor 202 which is rotated by a motor 201. A cylinder section 213 of the sludge dryer 12 has an inner wall 204 and outer wall 205 which are located in a coaxial relation. A spacing between the walls 204 and 205 provides a heated-vapor circulation jacket 206. Into an input port 207 of the jacket 206 is supplied the heated vapor 22 which comes from either one or both of the boilers 14 and 24. The heated vapor 22 is exhausted from an output part 208 of the jacket 206.

The dewatered sludge 19 coming from the hydro-extractor 11 is fed into an input port 209 of the sludge dryer 12. A great number of blades 203 are provided at predetermined places on the outer peripheral surface of the rotor 202 within the sludge drier 12. When the rotor 202 is rotated by the motor 201, the dewatered sludge 19 is crushed by the blades 203 to small fragments and, at the same time, the small fragments are dried by heat coming from the inner wall 204 which is heated by the heated vapor 22. The dried sludge thus crushed is delivered out of the sludge dryer 12, via a skirt section 215 and hopper 216.

The moisture which is extracted from the sludge thus dried is released out of the sludge dryer 12.

An explanation will be given below of a way for utilizing energy in the construction shown in FIG. 1.

Heated vapor 22 necessary to evaporation-dry the sludge 19 by the sludge dryer 12 is obtained by recovering the exhaust heat of the gas turbine engine 15 and, at the same time, electric power energy is obtained from the generator 16 by driving the engine 15. The electric power energy is utilized for the treatment of the sludge and for the meeting of a demand for electric power by the related power equipment.

As a result, the energy which is supplied to the gas-turbine engine 15 is employed for the drying of the sludge 19 and, at the same time, for conversion to electric energy. Generally, the power generation cost of the gas-turbine engine is higher than the electric power cost for which the user pays to the electric power company. According to the present invention, since it is possible to perform an electric power generation and, at the same time, a sludge treatment, a thermal energy cost necessary to treat the sludge corresponds to a difference between the electric power generation cost and the electric power purchasing cost and, as a result, it is possible to reduce the sludge treating cost.

Although the three-step process of the mechanical hydro-extracting (11), drying (12), and burning-up (13) is employed in the embodiment shown in FIG. 1, the present invention can be applied to a case wherein the process of both extracting and burning-up are omitted, or wherein either one of them is omitted.

It is thus possible, according to the present invention, to reduce the sludge treating cost because the energy for drying the sludge can be obtained from the exhaust heat of the gas-turbine engine 15.

A second embodiment of the present invention will now be explained below with reference to FIG. 3.

A sludge 20x of about 10 to 80% in water content level which has been obtained by evaporation-drying a sludge 19x of about 95 to 99% in water content level is charged into a fermentation tank 120x. In the tank 120x it is aerobically fermented to allow organic matter in the sludge to be decomposed from a polymeric to a monomeric substance. In this case, the fermentation is conducted at a pH of 6 to 9 (the best pH of 8) and a temperature of 60° C. to 70° C. By so doing a stable compost of 30 to 40% in water content level is manufactured, essentially consisting of phosphorus, potassium and carbon.

As the same time, some (160x) of the compost 140x manufactured in the fermentation tank 120x is returned back to the inlet of the fermentation tank 120x where it serves as a seed germ and bacteria.

The sludge 20x charged into the fermentation tank 120x has its water content reduced to 70 to 50% most suitable for the fermentation, thus eliminating the need for adding any additive material. The size of the fermentation tank 120x can be made smaller than that of the conventional fermentation tank, thus reducing the manufacturing cost of the compost 140x. The sludge 20x is heat-dried by the dryer 12x at a temperature above 100° C. to allow the amount of germs and bacteria to be decreased. As a result, it is possible to effectively employ some of the returned composite 160x as seed germs and bacterial and hence to enhance the fermentation efficiency with a lesser amount of returned compost.

According to the present invention, a compost can be effectively manufactured by heat-drying the sludge of a water content level (about 70 to 50%) most suitable for the fermentation and fermenting it in the fermentation tank with a lesser amount of germs and bacteria.

Figure 3:
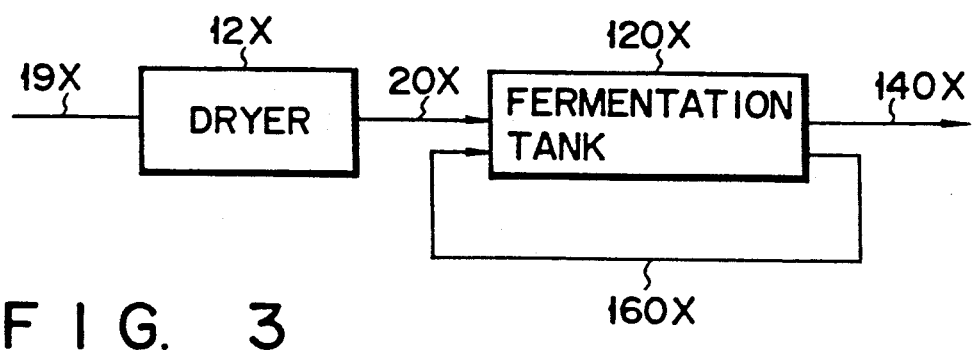
FIG. 3 is a block diagram showing an arrangement of a sludge treating apparatus (a sludge compost manufacturing apparatus) according to a second embodiment of the present invention.

Incidentally, the dryer 12x as shown in FIG. 3 can be of the same type as that (12) shown in FIG. 2.

A general arrangement of a compost manufacturing apparatus is disclosed in "the technical data 60–006 of Technical Development Section" entitled "Technical Survey Relating To Equipment for Manufacturing A Compost From A Sewage" by NIPPON GESUIDO JIGYO-DAN GIJITSU KAIHATSU-BU of GESUIDO JIGYO-DAN GYOMU FUKYU KYO-KAI, Jan. 1986.

Figure 4:
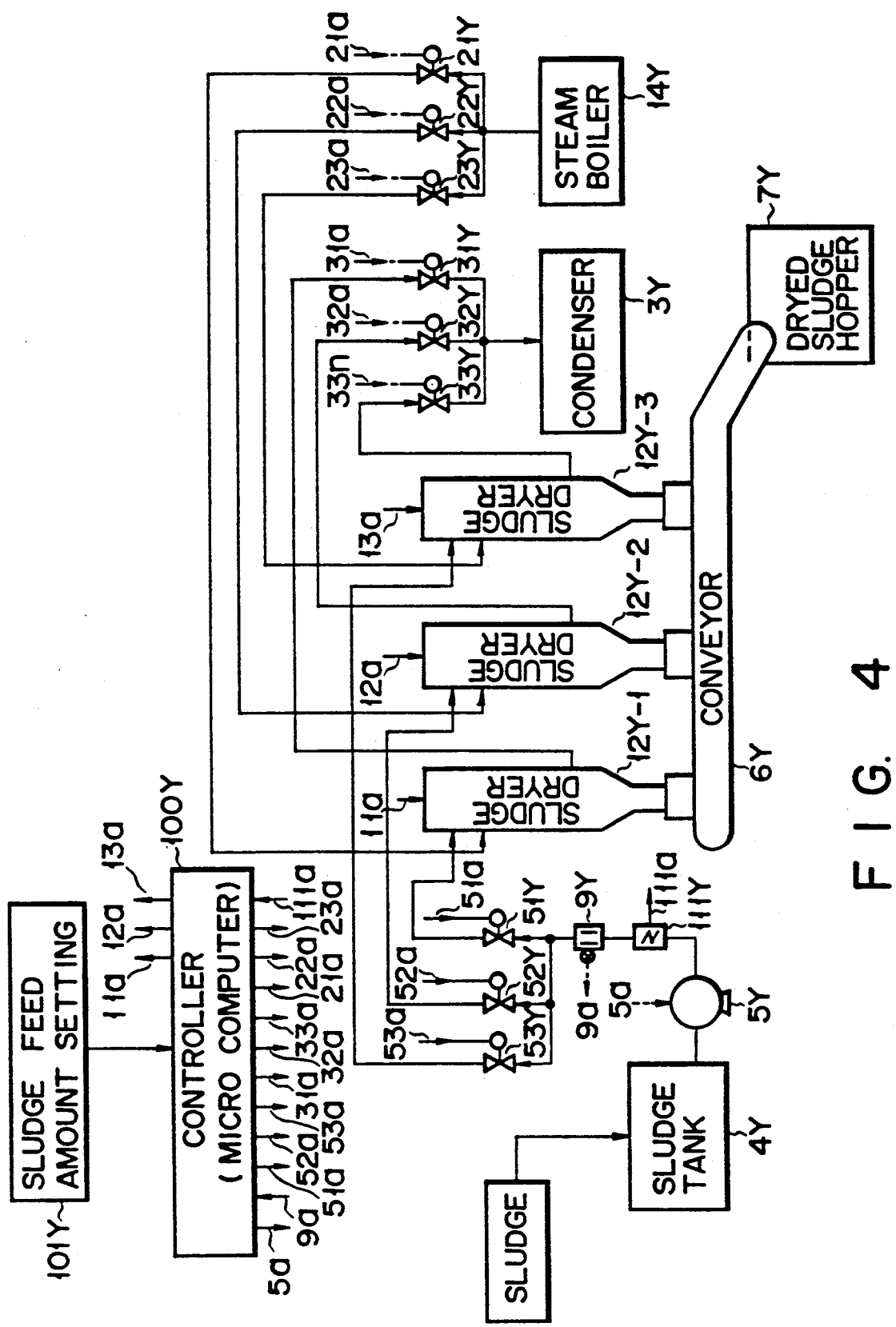
FIG. 4 is a block diagram showing an arrangement of a sludge treating apparatus (a sludge drying apparatus) according to a third embodiment of the present invention.

FIG. 4 shows an arrangement of an apparatus according to a third embodiment of the present invention.

In FIG. 4, a sludge which is stored in a sludge tank 4Y is supplied, by a liquid supply pump 5Y, to sludge dryers 12Y-1, 12Y-2, and 12Y-3, respectively through liquid values 51Y, 52Y, and 53Y. An amount of liquid flowed is detected by a flowmeter 9Y, the concentration γ of the liquid is detected by a concentration meter 111Y, and a signal 111a showing the concentration γ is input to a controller 100Y. The sludge which is dried by the dryers 12Y is charged by a transfer conveyor 6Y into a dried-sludge hopper 7Y.

Heated vapor for drying is generated by a steam boiler 14Y and supplied respectively through vapor valves to the dryers 12Y-1, 12Y-2, and 12Y-3. Returned vapor is red back to a condenser 3Y, via bleeding values 31Y, 32Y, and 33Y.

A liquid flow signal 9a and liquid concentration signal 111a are input to the controller 100Y. The controller 100Y supplies operation instructions 11a, 12a, and 13a to the sludge dryers 12Y-1, 12Y-2, and 12Y-3; opening/closing instructions 51a, 52a, and 53a to the sludge values 51Y, 52Y, and 53Y; opening/closing instructions 21a, 22a, and 23a to the vapor valves 21Y, 22Y, and 23Y; and opening/closing instructions 31a, 32a, and 33a to the bleeding valves 31Y, 32Y, and 33Y.

When a given sludge control signal Q is input to the controller 100Y, the number of the operating dryers (12Y) required is calculated from an equation given $$D = \frac{Q}{K} \quad (1)$$

where K denotes an amount of feeding liquid which makes constant the water content level of a dried sludge. In accordance with a sequence which is set in the controller 100Y, the controller 100Y delivers operation instructions to the sludge dryers 12Y-1, 12Y-2, and 12Y-3, and delivers opening/closing instructions to the corresponding liquid values 51Y, 52Y, and 53Y; vapor values 21Y, 22Y, and 23Y; and bleeding values 31Y, 32Y, and 33Y. Then the liquid is dispensed into the sludge dryers (12Y) and hence the sludge is supplied to the sludge dryer so as to obtain a substantially constant water level in the sludge.

An amount of liquid supplied for dry-treatment is set for an excess sludge, concentrated sludge, digesting sludge, etc., and the set level of the liquid can be either a total level of these sludges or any predetermined level thereof. However, the number of operating dryers calculated from equation (1) naturally contains a fraction in which case an amount of fluid corresponding to the fraction constitutes an error.

From the number of the operating dryers calculated from Equation (1), a target feeding amount Q1 is calculated by Equation (2) below and a flow setting signal 5a is delivered to the liquid supply pump 5Y so that compensation is made to achieve a constant flow operation.

$$Q_1 = D_1 \times K \quad (2)$$

Here D1 denotes an integer which is obtained by counting as one fractions of 0.5 or more which correspond to the number of the operating dryers calculated by Equation (1). As a way for controlling a flow of the liquid, use may be made of any of rotation number control, stroke control and exhaust valve control method in which case the number of the sludge dryers is not restricted to three.

Furthermore, the concentration of the sludge fed to the dryers is not always constant and, even if the amount of liquid is made constant, the water content level of a dried sludge obtained is sometimes not constant. With this in view, the liquid feeding amount is compensated by the concentration signal of a fluid concentration meter 111Y, using the following equation:

$$Q_2 = Q_1 \pm f(\gamma) \quad (3)$$

Here Q: a liquid feeding amount after compensation. f(γ): a function for the concentration Y.

Figure 5:
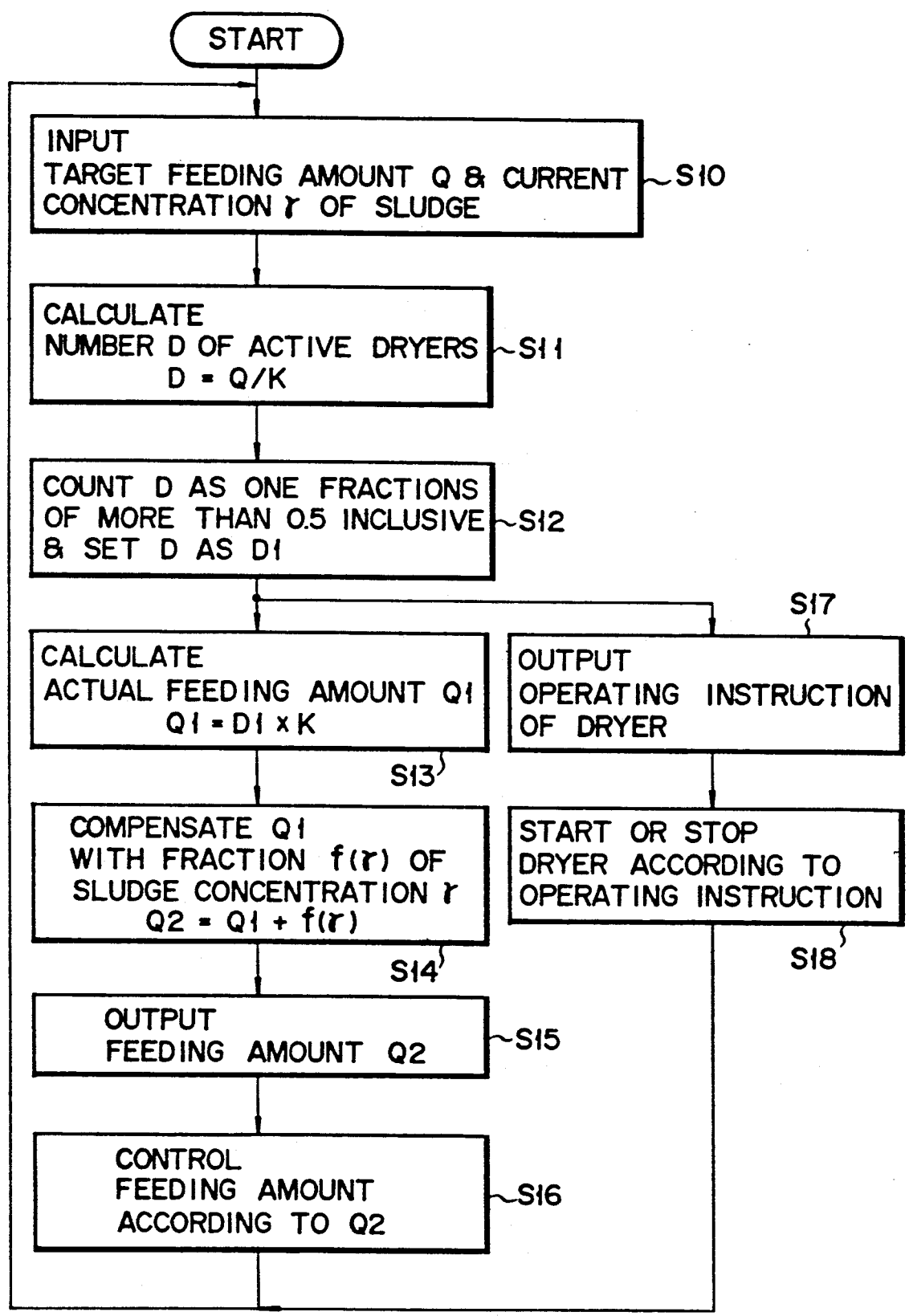
FIG. 5 shows a flowchart which illustrates a processing sequence performed by a control apparatus (microcomputer) of FIG. 4.

The controller 100Y FIG. 4 can be constructed of a microcomputer. The sludge treating process using such a microcomputer is as indicated by a flowchart of, for example, FIG. 5.

At step S10, a target feeding amount Q is input from a sludge feed amount setting section (FIG. 4) to the microcomputer 100Y, and a current liquid concentration $\gamma$ is input from the liquid concentration meter 111 to the microcomputer 100Y.

The microcomputer 100Y calculates a requisite number of operating dryers 12Y from the target feeding amount Q thus input and amount of liquid K previously calculated, in accordance with Equation (1)—step S11. As step S12, the fractions of the number of operating dryers D thus calculated are counted as one if the fractions are more than 0.5 inclusive, obtaining an integral number of operating dryers D1—step S12.

From the number of operating dryers D1 and known amount of feeding liquid K, an actual amount of feeding liquid Q1 is calculated based in Equation (2)—step S13. In accordance with Equation (2), the feeding amount Q2 is calculated from the feeding amount Q1 and liquid concentration $\gamma$ detected by the liquid concentration meter 111—step S14.

If the feeding amount Q2 is output at step S15, an actual feeding amount is controlled by various signals corresponding to the feeding amount Q2, that is, various signals output from the controller 100Y of FIG. 4—step 16.

In parallel with calculation step 13, an operation instruction is issued from the microcomputer 100Y to the dryers 12Y-1 to 12Y-3 - step S17. In accordance with the contents of the operation instruction the respective dryers are started or stopped—step S18.

Figure 6:
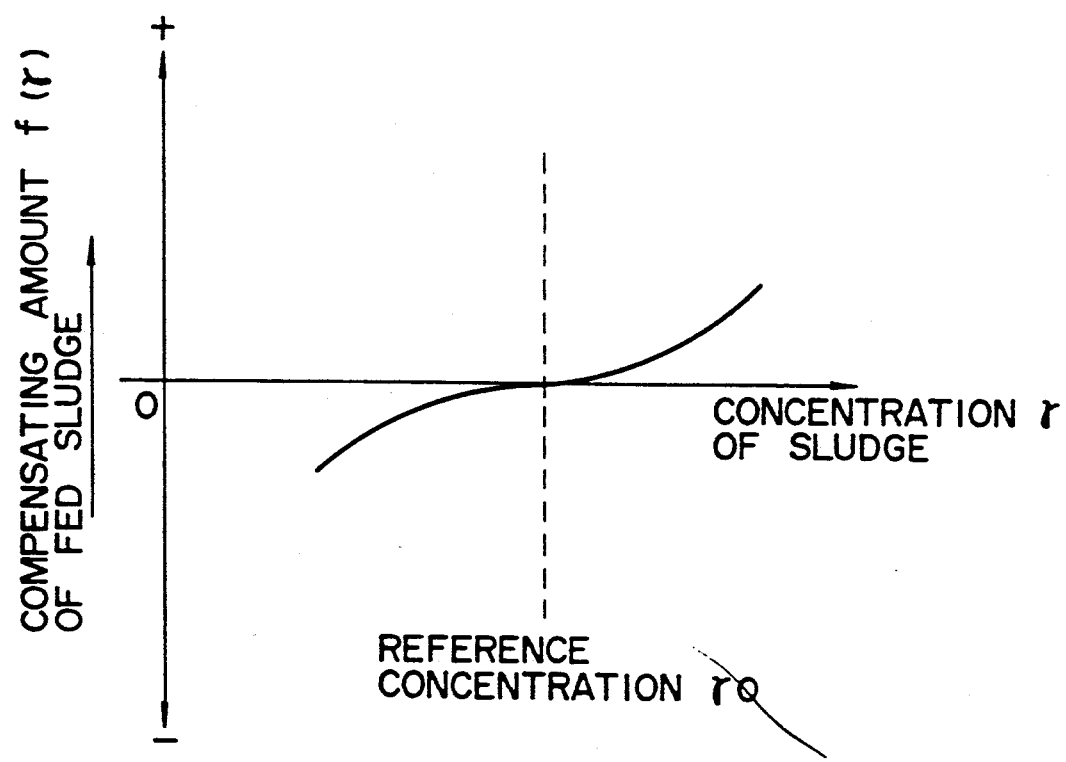
FIG. 6 is a graph illustrating a function f (γ) which is used to compensate for a feeding liquid concentration in the sequence of FIG. 5.

The function $f(\gamma)$ which is used to compensate for the feeding amount Q2 is as shown, for example, in FIG. 6 and can initially be found by experiments. The data of the function $f(\gamma)$ is initially loaded into, for example, a main memory, not shown, of the microcomputer 100Y.

In the embodiment of FIG. 4, when the number of operating sludge dryers is calculated from the feeding amount and feeding liquid concentration and control is carried out to make constant the liquid amount fed to the dryers, it is possible to operate the sludge dryers in a continuous fashion even if the feeding amount varies and to do it without the need for providing any sludge storage tank.

While the invention has been described in connection with what is presently considered to be the most practical and preferred embodiment, it is to be understood that the invention is not limited to the disclosed embodiment but, on the contrary, is intended to cover various modifications and equivalent arrangements included within the scope of the appended claims, which scope is to be accorded the broadest interpretation so as to encompass all such modifications and equivalent arrangements.

What is claimed is:

1. A sludge treating apparatus comprising:
   a gas turbine engine device which generates exhaust gas heat;
   heated-vapor generating means for generating heated vapor utilizing exhaust gas heat recovered from the gas turbine engine device;
   drying means, connected to the gas turbine engine device by the heated-vapor generating means, for heating and drying supplied sludge using heat coming from the heated vapor and for providing dried sludge;
   burning-up means for burning up the heated and dried sludge provided by the drying means and for reducing the heated and dried sludge to ash; and
   second heated-vapor generating means, connected to the burning-up means, for generating second heated vapor using heat form the burning-up of the heated and dried sludge and for supplying the second heated-vapor to the drying means.

2. The sludge treating apparatus according to claim 1, further comprising dehydrating means for dehydrating a slurry which is relatively high in a water content level and for supplying a resultant sludge to said drying means.

3. The sludge treating apparatus according to claim 1, further comprising a generator driven by said gas turbine engine device.

4. The sludge treating apparatus according to claim 1, further comprising fermenting means for fermenting said dried sludge containing organic matter, at a predetermined pH of 6 to 9 and a predetermined temperature of 60 to 70° C., and for decomposing the organic matter in said dried sludge into a compost.

5. The sludge treating apparatus comprising:
   at least one sludge dryer;
   liquid flow amount detecting means for detecting a total amount Q1 of sludge fed to the sludge dryer;
   feeding liquid concentration detecting means for detecting a feeding liquid concentration $\gamma$ of the sludge fed to the sludge dryer;
   control means, connected to the sludge dryer, feeding liquid flow detecting means, and feeding liquid concentration detecting means, for determining a number D of sludge dryers on the basis of said total amount Q1 of sludge, and said feeding liquid concentration $\gamma$; and
   means for actuating a predetermined number of said sludge dryers, said predetermined number being equal to the number D, determined by said control means.

6. The sludge treating apparatus according to claim 5, wherein said control means includes a computer by which the number D of operating sludge dryers is determined from a ratio Q/K for each sludge dryer where Q represents a target liquid feeding amount and K represents a liquid feeding amount at which the water content level of the sludge after being dried is held within a predetermined level.

7. The sludge treating apparatus according to claim 6, wherein said computer has a function for calculating data Q2, used for performing liquid flow control over the operating sludge dryer, from a sum of data Q1 corresponding to a product of an integer value D1 obtained by rounding a value of said ration Q/K and K, and a compensation function having said feeding liquid concentration $\gamma$ as a parameter.

8. A sludge evaporation drying apparatus comprising:
   a gas turbine generator for supplying electric power to sludge treatment equipment for drying a sludge;
   a gas turbine for driving the gas turbine generator, the gas turbine generating exhaust heat;
   an exhaust heat boiler for recovering the exhaust heat of the gas turbine generator, and for generating heated vapor; and
   a sludge dryer, supplied with heated vapor generated at the exhaust heat boiler, for heating and drying the sludge;
   burning-up means for burning up the heated and dried sludge provided by the sludge dryer and for reducing the heated and dried sludge to ash; and
   second heated-vapor generating means, connected to the burning-up means, for generating second heated vapor using heat from the burning-up of the heated and dried sludge and for supplying the second heated-vapor to the sludge dryer.

9. A sludge drying apparatus comprising:
a plurality of dryers for drying a sludge through utilization of heated vapor;
a liquid flowmeter for detecting a total amount of liquid fed to the dryer;
liquid valves each provided at a sludge supply tube of the respective dryer;
vapor valves provided at a vapor supply tube of the respective dryer;
bleeding valves provided at a vapor return tube of the dryer;
control means, coupled to said dryers, said liquid flowmeter, said liquid valves, said vapor valves, and said bleeding valves, and responsive to a detection signal from the fluid flowmeter, for calculating a number of operating dryers required to obtain a dried sludge of a predetermined water level, and for delivering an operation instruction to said dryers and one of an opening and a closing instruction to said liquid valves, vapor valves, and bleeding valves.

10. The sludge treating apparatus according to claim 1, wherein the drying means, burning-up means and second heated-vapor generating means form a closed heat loop.

11. The sludge evaporation drying apparatus according to claim 8, wherein the sludge dryer, burning-up means and second heated-vapor generating mean form a closed heat loop.

* * * * *